United States Patent [19]

Stringaro

[11] Patent Number: 5,162,288

[45] Date of Patent: Nov. 10, 1992

[54] CATALYST ELEMENT FOR HETEROGENEOUS REACTIONS

[75] Inventor: Jean-Paul Stringaro, Bulach, Switzerland

[73] Assignee: Sulzer Brothers Limited, Winterthur, Switzerland

[21] Appl. No.: 618,470

[22] Filed: Nov. 27, 1990

[30] Foreign Application Priority Data

Dec. 11, 1989 [CH] Switzerland ............... 04447/89

[51] Int. Cl.⁵ .................... B01J 32/00; B01J 35/04
[52] U.S. Cl. ............................ 502/439; 502/527
[58] Field of Search ..................... 502/439, 527

[56] References Cited

U.S. PATENT DOCUMENTS

| | | | |
|---|---|---|---|
| 3,944,505 | 3/1976 | La Croix | 502/527 X |
| 4,118,199 | 10/1978 | Völker et al. | 502/527 X |
| 4,382,323 | 5/1983 | Chapman et al. | 29/157 R |

FOREIGN PATENT DOCUMENTS 025308 3/1981 European Pat. Off. .
0149912 7/1985 European Pat. Off. .

Primary Examiner—W. J. Shine
Attorney, Agent, or Firm—Francis C. Hand

[57] ABSTRACT

The catalyst element consists of a carrier structure in the form of static mixer elements which are provided with a washcoat covering, the surface of which contains a catalyst. The carrier structure may consist of a metal skeleton or may be constructed of a solid ceramic material.

9 Claims, 2 Drawing Sheets

CATALYST ELEMENT FOR HETEROGENEOUS REACTIONS

This invention relates to a catalyst element and a reactor for heterogeneous reactions.

Heretofore, various types of reactors and catalyst elements have been known for the performance of heterogeneous catalytic reactions. For example, catalyst members have been constructed in the form of beds, monoliths, usually consisting of extruded structures with parallel ducts, or rolled-up corrugated structures. However, these known catalyst elements and reactors have considerable disadvantages. For example, in the case of beds, there are high pressure drops. In addition, the known catalyst element and reactors have had poor radial mixing, non-homogeneous concentration profiles and, frequently, extremely undesirable slip (in the case of monoliths). Further, in order to obtain good catalyst elements, very complex and expensive procedures have been employed in order to make such elements.

By way of example, U.S. Pat. No. 4,382,323 describes a method for manufacturing a wound foil structure comprising distinct catalysts. As described, the foil may be provided with an alumina coating which can be selectively impregnated with platinum and palladium catalysts.

European Patent Application 0025308 describes a structure which may be made of a metal honeycomb, ceramic honeycomb or profiled plates, each of which may be provided with a chemical active or catalytically active coating.

Still further, European Patent Application 0149912 describes a monolithic catalyst support structure which is provided not only with a washcoat covering to provide very high surface areas but also a catalyst in the washcoat coating.

It is an object of the invention to provide a catalyst element and a reactor which is particularly suitable for catalytic reactions with relatively little heat tone.

It is another object of the invention to provide a catalyst element and reactor which has a low pressure drop, very good radial mixing and homogeneous concentration profiles.

It is another object of the invention to extensively prevent slip in a catalyst element in an easy and inexpensive manner.

Briefly, the invention provides a catalyst element comprising a carrier structure in the form of a static mixer having a plurality of crossing flow paths extending therethrough for passage of a flowable media therethrough, a washcoat covering on the carrier structure within the flow paths to provide an enlarged surface area to the flowing media and a catalyst on the washcoat covering for effecting a catalytic reaction in the media flowing over the washcoat covering.

In one embodiment, the carrier structure includes a plurality of corrugated strata arranged in parallel layers. In another embodiment, the carrier structure is in the form of a metal skeleton formed of a plurality of stainless steel sheets.

Basically, the carrier structure is constructed in the form of a static mixer so as to have a large surface to provide an efficient optimum mixing and homogenization of a catalytic reaction. The combination of this structure with a washcoat covering provides a considerable enlargement of the reaction area and, hence, overall an inexpensive and efficient catalyst effect in a simple manner.

The invention also provides a reactor for catalytic reactions comprising a reactor wall defining a vertically disposed flow path for a flowable medium and a carrier structure, as above, disposed within the flow path.

Suitable forms of the carrier structure may have an angle of inclination of the static mixer elements to the main direction of flow within the flow path of the reactor equal to at least 10°. Alternatively, the carrier structure may consist of corrugated layers and, more particularly, Sulzer-SMV-mixer forms arranged in parallel layers. Very simple production techniques can be employed where the carrier structure is formed of one piece. In addition, the carrier structure may be made of solid ceramic material.

The washcoat covering may be formed of at least one of an alkaline earth metal oxide and a transition metal oxide, such as aluminum oxide. Good reaction characteristics with a washcoat covering can be obtained with specific surfaces of from 20 to 200 meters $^2$/gram (m$^2$/g) and surface enlargements of from 100 to 100,000 meters $^2$/meters$^2$ (m$^2$/m$^2$) relative to the geometric area.

The carrier structure is made of a solid ceramic material selected from the group consisting of cordierite, mullite, steatite, aluminum oxide and silicon oxide.

The reactor may be constructed so that the carrier structure includes at least two vertically spaced portions. In this case, a heat exchanger may be disposed between the two portions of the carrier structure so as to control high heat tones.

These and other objects and advantages of the invention will become more apparent from the following detailed structure taken in conjunction with the accompanying drawings wherein:

BRIEF DESCRIPTION OF THE DRAWINGS

Referring to FIG. 1, the reactor 1 is constructed for catalytic reactions and includes a reactor wall 2 defining a vertically disposed flow path for a flowable media such as a liquid or gaseous media. In addition, the reactor has an inlet 3 at the lower end for the introduction of the flowable media and an outlet 4 at the upper end for the exhaust of the reacted media. Any suitable means (not shown) may be provided for delivering the flowable media to the reactor inlet 3. As illustrated, a catalyst element 7 in the form of a packing of predetermined length L is provided within the flow path of the reactor. In this respect, the catalyst element 7 consists of three stage 11, 12, 13, each consisting of static mixer elements 16 disposed in parallel layers.

Figure 3:
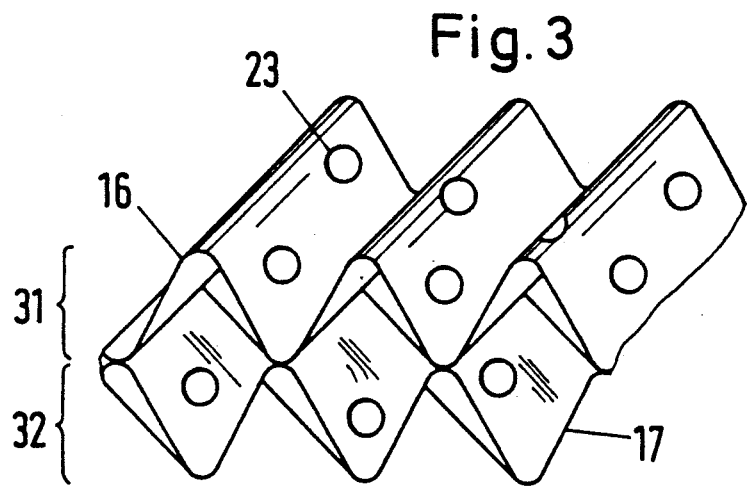
FIG. 3 illustrates a partial perspective view of a carrier structure formed of corrugated layers in accordance with the invention.

As illustrated, each stage 11, 12, 13 is formed of a carrier structure having a plurality of corrugated strata arranged in parallel layers, for example as indicated in FIG. 3. Further, each strata has corrugations disposed at an angle of inclination W of at least 10° to the vertical axis Z, i.e. the main direction of flow, of the reactor 1.

The corrugated layers of the alternate stages 11, 12 are parallel to a space plane Z, X while the layers of the intermediate stage 12 are parallel to a space plane Z, Y disposed at a 90° angle to the first plane. The layers are also aligned in alternating manner in the direction +W and −W so that crossing sub-flows are formed. Thus, maximum mixing with minimum pressure drop is obtained between the layers. This will be apparent from FIG. 3 in which the static mixer elements 16 are constructed in the form of corrugated strata 17 and disposed in layers 31, 32. These layers 31, 32 can be stacked on one another or the carrier structure of the static mixer elements 16 may also comprise one piece or be connected to form one piece. In principle, different static mixer forms which are known per se and which have large surfaces can be used. The carrier structure can also have additional passage apertures 23 to promote mixing and to reduce the pressure drop. Alternatively, the carrier structures may be structured, for example, being fluted, in order to increase the surface area.

Figure 4:
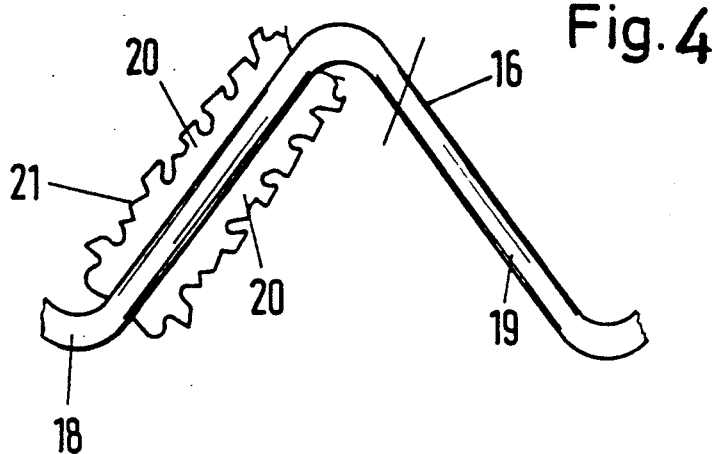
FIG. 4 illustrates a portion of a carrier structure having a washcoat covering and a catalyst thereon in accordance with the invention.

FIG. 4 illustrates a construction for the catalyst element 7 with a carrier structure in the form of static mixer elements 16 which are formed from a metal skeleton 18, for example, stainless steel sheet, or may consist of a ceramic coating 19. In addition, a washcoat covering 20 is applied to the carrier structure 16 in order to provide an enlarged surface area to a flowing media within the reactor. In addition, a catalyst 21 is provided on the washcoat covering 20 for effecting a catalytic reaction in the media flowing over the washcoat covering 20. This catalyst 21 is situated at least at the surface of the washcoat covering 20.

The washcoat covering 20 permits a large and adjustable specific surface of, for example, 20 to 200 square meters/gram and a surface enlargement of, for example, 100 to 100,000 square meters/square meter to be easily and inexpensively produced. In combination with the large mixing effect of the carrier structure, optimum reaction with high efficiency can be obtained-almost made to measure.

Figure 1:
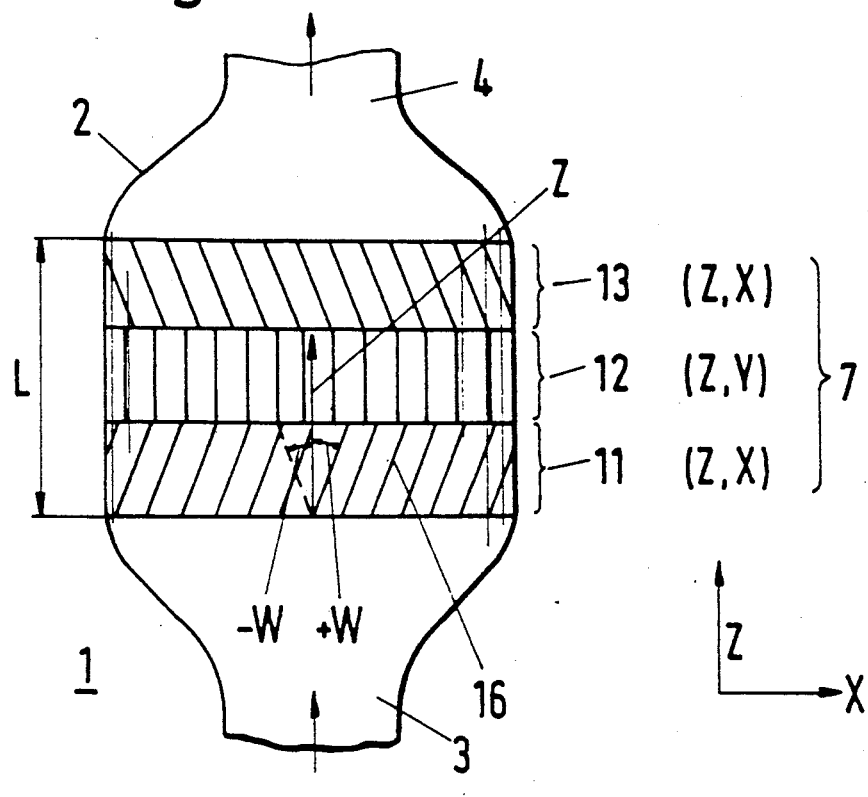
FIG. 1 illustrates a schematic cross sectional view of a reactor constructed in accordance with the invention.
Figure 2:
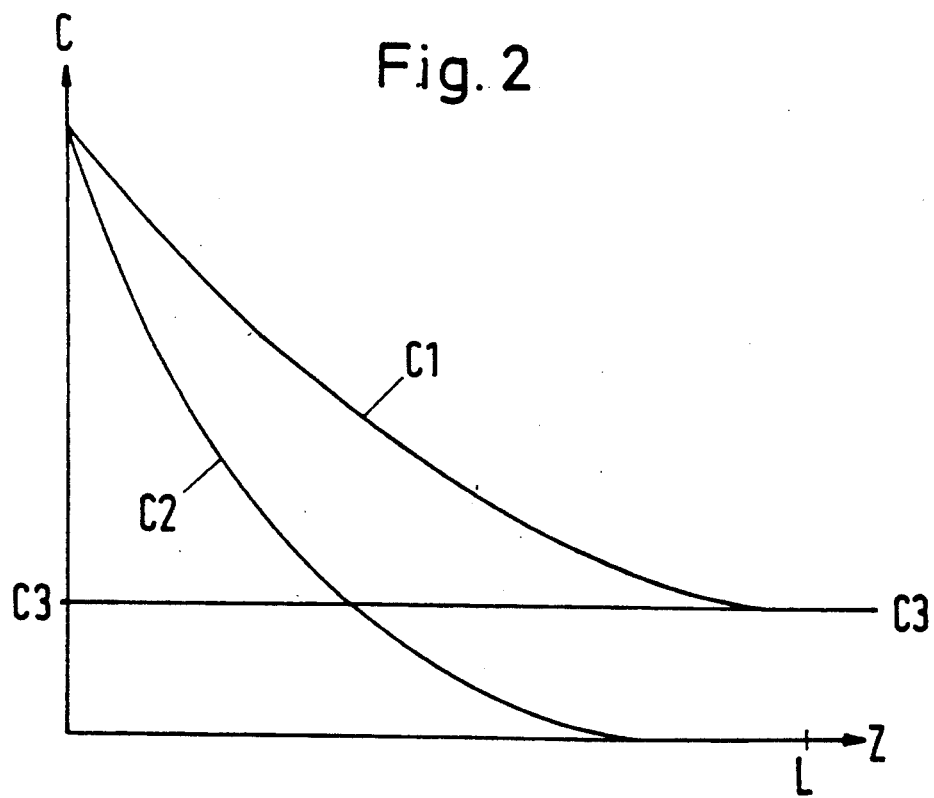
FIG. 2 graphically illustrates a concentration curve for a reactor constructed in accordance with the invention relative to a prior art reactor.

FIG. 2 is a diagrammatic example of the curve of a catalytically reduced concentration C over the reactor length L in the main direction of flow Z. With prior art reactors, the concentration curve is as shown at C1 with a harmful residual value in the form of a slip, C3, at the end L of the reactor. The concentration C2 of the reactor according to FIG. 1, on the other hand, decreases more intensively and continuously to the value 0 without any slip occurring at the end of the reactor L.

Figure 5:
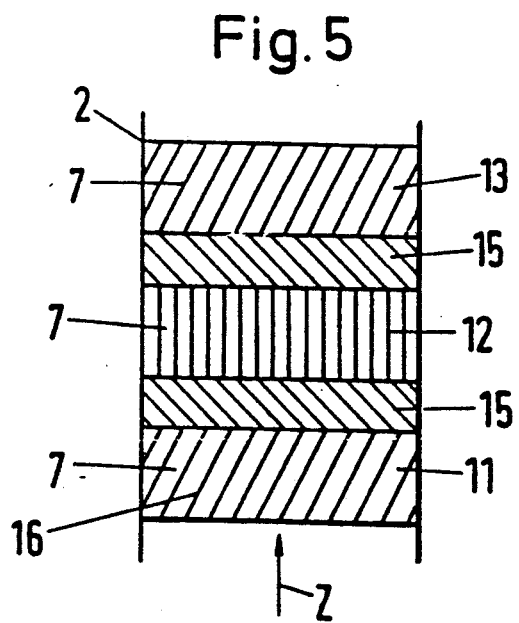
FIG. 5 illustrates a diagrammatic cross-section of a modified reactor employing alternating catalyst element portions and heat exchangers in accordance with the invention.

Normally, a catalyst element 7 or a reactor 1 for catalytic reactions is used with a relatively low heat tone. However, in order to enable even somewhat higher heat tones to be controlled, the catalyst element 7 may be divided as illustrated in FIG. 5 into a plurality of separate portions 11, 12, 13 with a heat exchanger 15 incorporated between the alternate portions in order to supply and discharge the heat tone of each preceding portion.

The invention thus provides a catalyst element which can be fabricated in a relatively easy manner and which can be used in a reactor for heterogeneous catalytic reactions without any extensive residual slip occurring. Further, the catalyst element provides for a low pressure drop, good radial mixing and homogeneous concentration profiles within the reactor during operation.

What is claimed is:

1. A catalyst element comprising
   a carrier structure in the form of a static mixer having a plurality of corrugated layers, each layer having corrugations disposed at an angle of inclination to a vertical axis and in open and crossing relation to the corrugations of an adjacent layer to define straight crossing flow paths extending therethrough
   a washcoat covering on said carrier structure within said flow paths to provide an enlarged surface area to the flowing media; and
   a catalyst on said washcoat covering for effecting a catalytic reaction in the media flowing over said washcoat covering.

2. A catalyst element as set forth in claim 1 wherein said carrier structure includes a plurality of corrugated strata arranged in parallel layers.

3. A catalyst element as set forth in claim 1 wherein said carrier structure is of one-piece construction.

4. A catalyst element as set forth in claim 1 wherein said carrier structure is a metal skeleton formed of a plurality of stainless steel sheets.

5. A catalyst element as set forth in claim 1 wherein said washcoat covering is formed of at least one of an alkaline earth metal oxide and a transition metal oxide.

6. A catalyst element as set forth in claim 1 wherein said washcoat covering is formed of aluminum oxide.

7. A catalyst element as set forth in claim 1 herein said carrier structure is made of a solid ceramic material selected from the group consisting of cordierite, mullite, steatite, aluminum oxide and silicon oxide.

8. A catalyst element as set forth in claim 1 wherein said washcoat covering has a specific surface of from 20 to 200 meters$^2$/gram.

9. A catalyst element as set forth in claim 1 wherein said washcoat covering has a surface enlargement of from 100 to 100,000 m$^2$/m$^2$ relative to the geometric area.

* * * * *